United States Patent
Matsuura et al.

(10) Patent No.: US 8,517,455 B2
(45) Date of Patent: Aug. 27, 2013

(54) STRUCTURE FOR VEHICLE BODY REAR PORTION

(75) Inventors: Norikazu Matsuura, Wako (JP); Syouji Machida, Tochigi (JP); Kazuhiro Kikuchi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/392,690

(22) PCT Filed: Jul. 30, 2010

(86) PCT No.: PCT/JP2010/062890
§ 371 (c)(1),
(2), (4) Date: Feb. 27, 2012

(87) PCT Pub. No.: WO2011/027638
PCT Pub. Date: Mar. 10, 2011

(65) Prior Publication Data
US 2012/0153677 A1 Jun. 21, 2012

(30) Foreign Application Priority Data
Sep. 4, 2009 (JP) ................................. 2009-204745

(51) Int. Cl.
*B62D 25/08* (2006.01)
(52) U.S. Cl.
USPC ................... 296/187.11; 296/203.04; 296/205
(58) Field of Classification Search
USPC ............. 296/203.01, 203.03, 203.04, 193.05, 296/193.08, 187.11, 205
See application file for complete search history.

(56) References Cited

U.S. PATENT DOCUMENTS

| | | | |
|---|---|---|---|
| 4,357,040 A * | 11/1982 | Tomioka et al. | 293/102 |
| 4,775,181 A * | 10/1988 | Shoda | 296/203.04 |
| 5,228,741 A | 7/1993 | Ide | |
| 6,254,174 B1 * | 7/2001 | Wee | 296/203.04 |

FOREIGN PATENT DOCUMENTS

| | | |
|---|---|---|
| JP | 02-256570 | 10/1990 |
| JP | 04-129883 | 4/1992 |
| JP | 11-180349 | * 7/1999 |
| JP | 2005-306192 | 11/2005 |
| JP | 2008-284936 | 11/2008 |

\* cited by examiner

*Primary Examiner* — Dennis Pedder
(74) *Attorney, Agent, or Firm* — Rankin, Hill & Clark LLP (57) ABSTRACT

A structure for a vehicle body rear portion, absorbing an impact load applied to the vehicle body rear portion. The structure for a vehicle body rear portion includes: left and right girder sections (42) which rise upward from a rear panel (22) provided at the vehicle body rear portion and which are deformable by an impact load applied to the rear panel; and left and right upper girder sections (43) which are connected to the upper ends (42*b*) of the lower girder sections (42), extend toward the front of the vehicle up to left and right roof side rails (14), are configured to have higher strength than the lower girder sections, and transmits the impact load to the roof side rails. Left and right girder stiffeners (45) are provided so as to reinforce the girder joint sections (48) between the lower girder sections and the upper girder sections.

9 Claims, 8 Drawing Sheets

STRUCTURE FOR VEHICLE BODY REAR PORTION

TECHNICAL FIELD

The present invention relates to a vehicle body rear portion structure having a rear wall section provided to a vehicle body rear portion and configured to bear an impact load applied to a rear panel forming the rear wall section.

BACKGROUND ART

In a known example of a vehicle body rear portion structure, a bumper beam spans a rear end section of left and right rear side frames interposed by a rear panel, a rear panel upper member is provided above the bumper beam (i.e., upper section of the rear panel), a load-transmitting beam is provided, at an upward slope toward the vehicle front, to left and right end sections of the rear panel upper member, a front end section of the left and right load-transmitting beams is connected to left and right closed-cross-section skeletal sections, and the left and right closed-cross-section skeletal sections are provided to left and right side sections of the vehicle body.

In accordance with this structure for a vehicle body rear portion, the impact load is applied to the bumper beam and the rear panel upper member in the case that a counterpart vehicle has collided from the rear of the vehicle. The impact load applied to the bumper beam is transmitted to the left and right rear side frames.

The impact load applied to the rear panel upper member is transmitted to the left and right load-transmitting beams, and is transmitted to the left and right closed-cross-section skeletal sections via the left and right load-transmitting beams.

The impact load transmitted to the left and right closed-cross-section skeletal sections is transmitted to the left and right side sections of the vehicle body via the left and right closed-cross-section skeletal sections (e.g., see Patent Literature 1).

PRIOR ART LITERATURE

Patent Literature

Patent Literature 1: JP-A 2005-306192

SUMMARY OF INVENTION

Technical Problem

Here, the vehicle body rear portion structure of Patent Literature 1 requires left and right load-transmitting beams and left and right closed-cross-section skeletal sections because an impact load applied to the rear panel upper member is transmitted to the vehicle body. Accordingly, the number of components is increased, making it difficult to reduce cost and weight.

The vehicle body rear portion structure of Patent Literature 1 is furthermore configured so that the impact load applied to the rear panel upper member is transmitted to the vehicle body without being absorbed by the left and right load-transmitting beams and the left and right closed-cross-section skeletal sections. Accordingly, a relatively high impact load is transmitted to the vehicle body. Therefore, the strength (rigidity) of the vehicle body must be set to a high level so that the relatively high impact load is supported by the vehicle body.

Additionally, a relatively large reaction force is applied to the counterpart vehicle (i.e., the counterpart vehicle that has collided from the vehicle rear) from the left and right load-transmitting beams because a relatively high impact load is transmitted to the left and right load-transmitting beams.

An object of the present invention is to provide a structure for a vehicle body rear portion that can bear an impact load applied from the rear of the vehicle in the forward direction, that can minimize an increase in the number of components, and that can considerably minimize the impact load transmitted to the vehicle body and the reaction force applied to the counterpart vehicle.

Solution to Problem

According to a first aspect of the present invention, there is provided a vehicle body rear portion structure comprising: a rear panel provided to a vehicle body rear portion so as to extend in a width direction of a vehicle; a lower garter section rising from the rear panel and capable of deforming under an impact load applied to the rear panel; an upper garter section connected to an upper end section of the lower garter section, extending forwardly of the vehicle up to a roof side rail, formed to a higher level of strength than the lower garter section, and being capable of transmitting the impact load to the roof side rail; and a garter stiffener for reinforcing a connecting section between the lower garter section and the upper garter section.

Preferably, the garter stiffener is connected to an upper surface of a rear section of the upper garter section and provided along an outer surface of the lower garter section.

Preferably, each of the lower garter section and the upper garter section is formed to have a closed cross section; and the upper garter section and the lower garter section are joined by MIG welding, and the upper garter section and the garter stiffener are joined by MIG welding.

Preferably, each of the lower garter section and the upper garter section is formed to have a closed cross section; an electrode insertion hole for spot welding is formed in the lower garter section or the upper garter section in order to join the upper garter section and the lower garter section by spot welding; and the garter stiffener is provided so that the electrode insertion hole is covered by the garter stiffener.

Preferably, the garter stiffener is disposed along an outer surface of the lower garter section, the garter stiffener having an upper end section connected to the upper garter section and a lower end section connected to the rear panel.

Preferably, the lower end section of the garter stiffener is coupled to the rear panel by a fastener member.

Preferably, the garter stiffener is formed using a metal plate.

Preferably, an inflator for causing an airbag to deploy is provided along the lengthwise direction of the upper garter section, whereby the upper garter section is reinforced to a higher level of strength than the lower garter section with the aid of the inflator.

Preferably, the vehicle body rear portion structure further comprises: a rear bumper beam extending in the vehicle width direction in the vehicle rear side of the rear panel and capable of deforming toward the rear panel by an impact load; and a rear panel upper member that extends along the rear bumper beam in the rear panel, and thereby reinforces the rear panel, wherein when the rear bumper beam has deformed toward the direction of the rear panel, the deformed rear bumper beam makes contact with the rear panel upper member.

Preferably, the rear panel upper member has an external end section in the vehicle width direction that extends to a lower region of the garter stiffener.

Advantageous Effects of Invention

In the present invention, a lower garter section is erected upward from the rear panel, the lower garter section capable of being deformed by an impact load. Therefore, in the case that a counterpart vehicle has collided with the rear panel from the vehicle rear and an impact load has been applied to the rear panel, the lower garter section can be made to deform toward the vehicle front under the impact load to absorb a portion thereof.

Here, the upper garter section is extended from the upper end of the lower garter section to the roof side rail, and the upper garter section is formed to be of higher strength (higher rigidity) than the lower garter section. The section where the lower garter section and upper garter section are connected is reinforced by the garter stiffener. Therefore, in a state where the lower garter section has been deformed toward the vehicle front, it is possible for the lower garter section and the upper garter section to be kept in a connected state.

Maintaining the lower garter section and the upper garter section in a connected state enables the remaining impact load to be transmitted to the roof side rail by the upper garter section. Thus, having a portion of the impact load absorbed by the lower garter section enables the impact load transmitted to the roof side rail via the upper garter section to be minimized. In addition, minimizing the impact load transmitted to the roof side rail makes it possible to minimize the reaction force applied to the counterpart vehicle.

Here, the lower garter section and the upper garter section can be used as frame members constituting a portion of the vehicle body rear portion structure. Therefore, a frame member constituting a portion of the vehicle body rear portion structure can be used for dual purposes as a member for absorbing and as a member for transmitting an impact load. An increase in the number of components can thereby be minimized because there is no need to separately provide a member for absorbing and a member for transmitting an impact load.

When an impact load is applied from the rear toward the front of the vehicle in a structure for a vehicle body rear portion in which the garter stiffener is connected to the upper surface of the rear section of the upper garter section and is provided along the outer surface of the lower garter section, the region of the garter stiffener provided along the outer surface of the lower garter section follows the lower garter section and deforms toward the vehicle front.

Therefore, a tensile force is applied to the region of the garter stiffener (the upper end section of the stiffener) that is connected to the upper surface of the upper garter section. When a tensile force is applied to the stiffener upper end section, a shearing force is generated in the section where the stiffener upper end section and the upper surface of the upper garter section are connected.

Here, in the case that the stiffener upper end section and the lower surface of the upper garter section have been joined by welding, the joint section breaks by a smaller force than the shearing force because a detaching force acts due to the tensile force from the stiffener upper end section.

However, in the case that the stiffener upper end section and the upper surface of the upper garter section have been joined by welding, the joint section can be kept at a relatively higher level of strength in relation to a case where the front surface has been welded by the shearing force from the stiffener upper end section.

Therefore, a shearing force is generated in the joint section when the stiffener lower end section has been made to deform, whereby the stiffener upper end section can be kept in a state of being joined to the upper surface of the upper garter section. The state of connection between the upper garter section and the lower garter section can thereby be maintained by the garter stiffener, and an impact load can be reliably transmitted from the lower garter section to the upper garter section.

Each of the lower garter section and the upper garter section is formed to be closed in cross section. Therefore, an electrode insertion hole (i.e., a hole through which a spot-welding electrode is inserted) must be formed in the lower garter section or the upper garter section in order to join the lower garter section and the upper garter section by spot welding. Accordingly, the rigidity of the garter section must be ensured with consideration given to the reduction in rigidity caused by the electrode insertion hole.

In view of the above, the upper garter section and the lower garter section are joined by MIG welding and the upper garter section and the garter stiffener are joined by MIG welding. MIG welding is a type of inert-gas arc welding and employs a welding wire as an electrode. In other words, MIG welding does not require two sections to be held between two electrodes to be joined as is the case in spot welding when such sections are to be joined. Accordingly, the need to form an electrode insertion hole in the lower garter section or the upper garter section is obviated and the rigidity of the garter section can be readily ensured.

Each of the lower garter section and the upper garter section is formed having a closed cross section, and an electrode insertion hole is formed in the lower garter section or the upper garter section. An electrode for spot welding is inserted from the electrode insertion hole, and the upper garter section and the lower garter section are joined by spot welding.

When the upper garter section and the lower garter section are to be spot welded, the upper garter section and lower garter section are superimposed and held between a pair of electrodes, an electric current is fed to the pair of electrodes, and the upper garter section and the lower garter section are joined together. Therefore, an electrode insertion hole is required for inserting an electrode in the lower garter section or the upper garter section.

The electrode insertion hole is covered by the garter stiffener, whereby the electrode insertion hole can be reinforced by the garter stiffener. It is thereby possible, in the case that an impact load is applied to the lower garter section and the upper garter section, to prevent stress from concentrating in the electrode insertion hole and to ensure the rigidity of the garter section.

The upper end section of the garter stiffener is connected to the upper garter section and the lower end section of the garter stiffener is connected to the rear panel. Connecting the lower end section of the garter stiffener to the rear panel enables an impact load applied to the rear panel to be rapidly transmitted to the lower garter section via the garter stiffener.

Having the upper end section of the garter stiffener connected to the upper garter section and the lower end section connected to the rear panel enables the garter stiffener to be provided across the entire range from the upper end to the lower end of the lower garter section. Therefore, an impact load can be transmitted across the entire range of the lower garter section via the garter stiffener. It is thereby possible to cause the entire range of the lower garter section to deform under the impact load and efficiently absorb the impact load.

The lower end section of the garter stiffener is coupled using a fastener member.

A force that intersects the lengthwise direction is applied to the lower end section of the garter stiffener and a force that pulls the lower end section of the garter stiffener in the lengthwise direction is applied when the garter stiffener deforms toward the vehicle front under an impact load, following the lower garter section.

A tensile force is applied to the fastener member in the case that a force that intersects with the lengthwise direction is applied to the lower end section of the garter stiffener.

A shearing force is applied to the fastener member in the case that a force that pulls in the lengthwise direction is applied to the lower end section of the garter stiffener.

Here, the fastener member can be kept at high strength (rigidity) in relation to the tensile force and shearing force in comparison with a welded joint section. Therefore, it is possible to keep the lower end section of the garter stiffener in a coupled state in the case that an impact load is applied. It is thereby possible to reliably transmit an impact load to the lower garter section and the upper garter section via the garter stiffener.

The garter stiffener is formed using a metal plate. The metal plate is a member that can suitably deform under an impact load. Therefore, the garter stiffener can be made to follow the lower garter section and suitably deform in the case that an impact load is applied. The garter stiffener is made to deform toward the vehicle front following the lower garter section, whereby the impact load can be efficiently absorbed.

The garter stiffener is furthermore made to deform toward vehicle front following the lower garter section, whereby the tensile force can be applied to the stiffener upper end section of the garter stiffener that is joined with the lower garter section. Applying the tensile force to the stiffener upper end section generates a shearing force in the joint section between the stiffener upper end section and the upper surface of the upper garter section.

As described above, the joint section can be kept at relatively high strength (rigidity) with respect to the shearing force. Therefore, having a shearing force generated in the joint section when the stiffener lower end section has been made to deform enables the stiffener upper end section to be kept in a state of being joined to the upper surface of the upper garter section. It is thereby possible to have the upper garter section and the lower garter section maintained in a connected state by the garter stiffener, and the impact load can be reliably transmitted from the lower garter section to the upper garter section.

The metal plate is a readily available plate material, and forming the garter stiffener from a readily available metal plate enables the garter stiffener to be obtained at low cost.

An inflator is disposed along the lengthwise direction of the upper garter section, whereby the upper garter section can be reinforced by the inflator. Therefore, the upper garter section can be formed to be of higher strength (rigidity) than the lower garter section. Accordingly, the impact load transmitted from the lower garter section can be reliably transmitted to the roof side rail by the upper garter section.

The inflator can be dually used as a reinforcement member, whereby the high strength (rigidity) of the upper garter section can be ensured without increasing the thickness dimension of the upper garter section or without using a highly rigid material. The upper garter section can thereby be formed to a higher level of strength (rigidity) than the lower garter section in a state in which weight and cost increases are minimized.

The rear bumper beam on the vehicle rear side of the rear panel extends toward the vehicle width direction. The rear panel upper member is provided to the rear panel and the rear panel is reinforced by the rear panel upper member.

When the rear bumper beam has deformed toward the rear panel due to the application of an impact load, the deformed rear bumper beam is designed to make contact with the rear panel upper member.

Therefore, the impact load applied to the rear bumper beam can be dispersed to a wide area of the rear panel via the rear panel upper member, and the rear panel can be prevented from local deformation.

Dispersing the impact load to a wide area of the rear panel thus enables the impact load dispersed to the rear panel to be reliably transmitted from the rear panel to the lower garter section and the garter stiffener.

The external end section of the rear panel upper member extends to the region below the garter stiffener. The impact load transmitted to the rear panel can thereby be rapidly transmitted from the rear panel to the garter stiffener.

DESCRIPTION OF EMBODIMENTS

Certain preferred embodiments of the present invention will be described below with reference to the drawings.

First Embodiment

A vehicle body rear portion structure 10 according to a first embodiment will be described.

Figure 1:
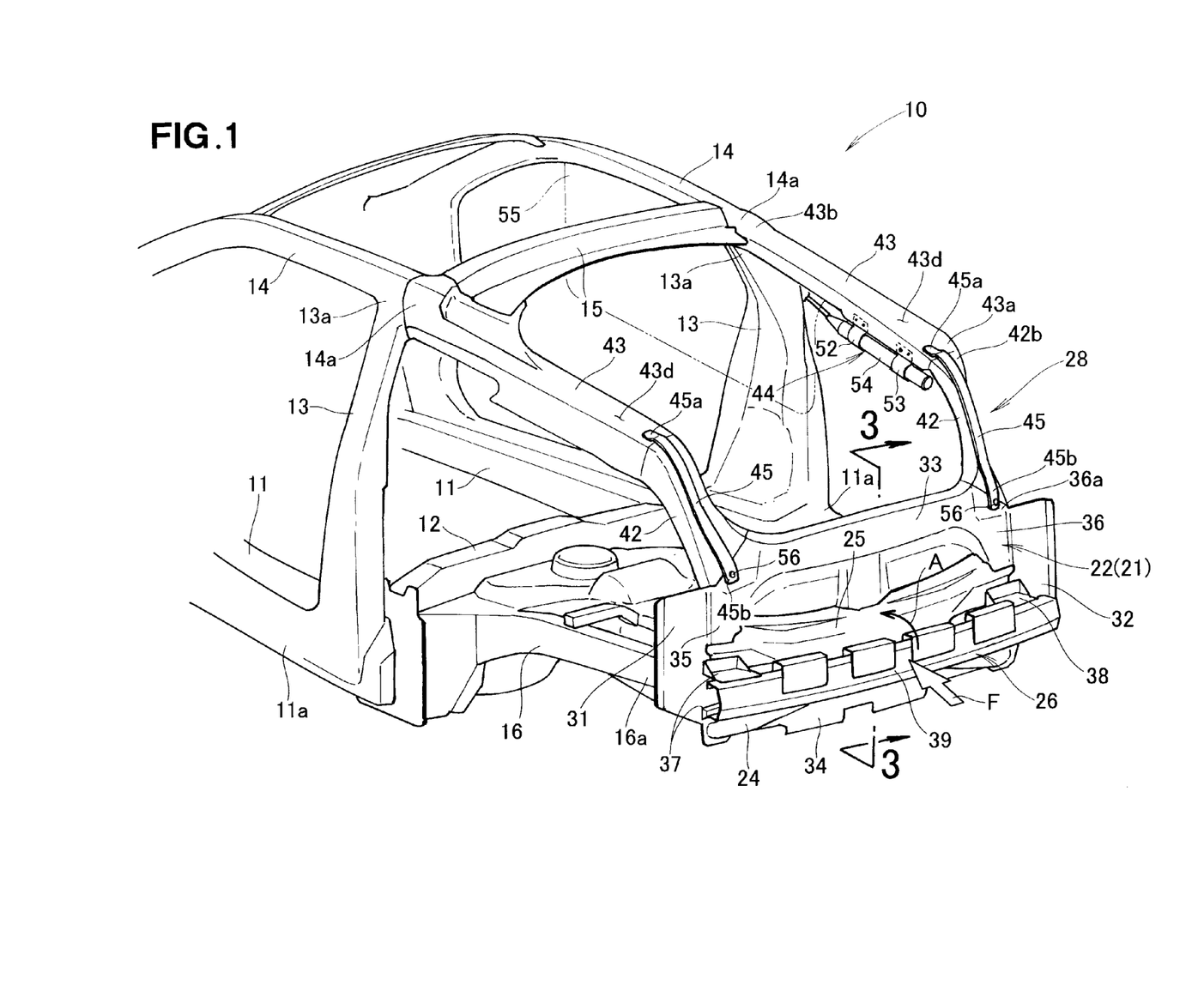
FIG. 1 is a perspective view showing a vehicle body rear portion structure according to a first embodiment of the present invention.
Figure 3:
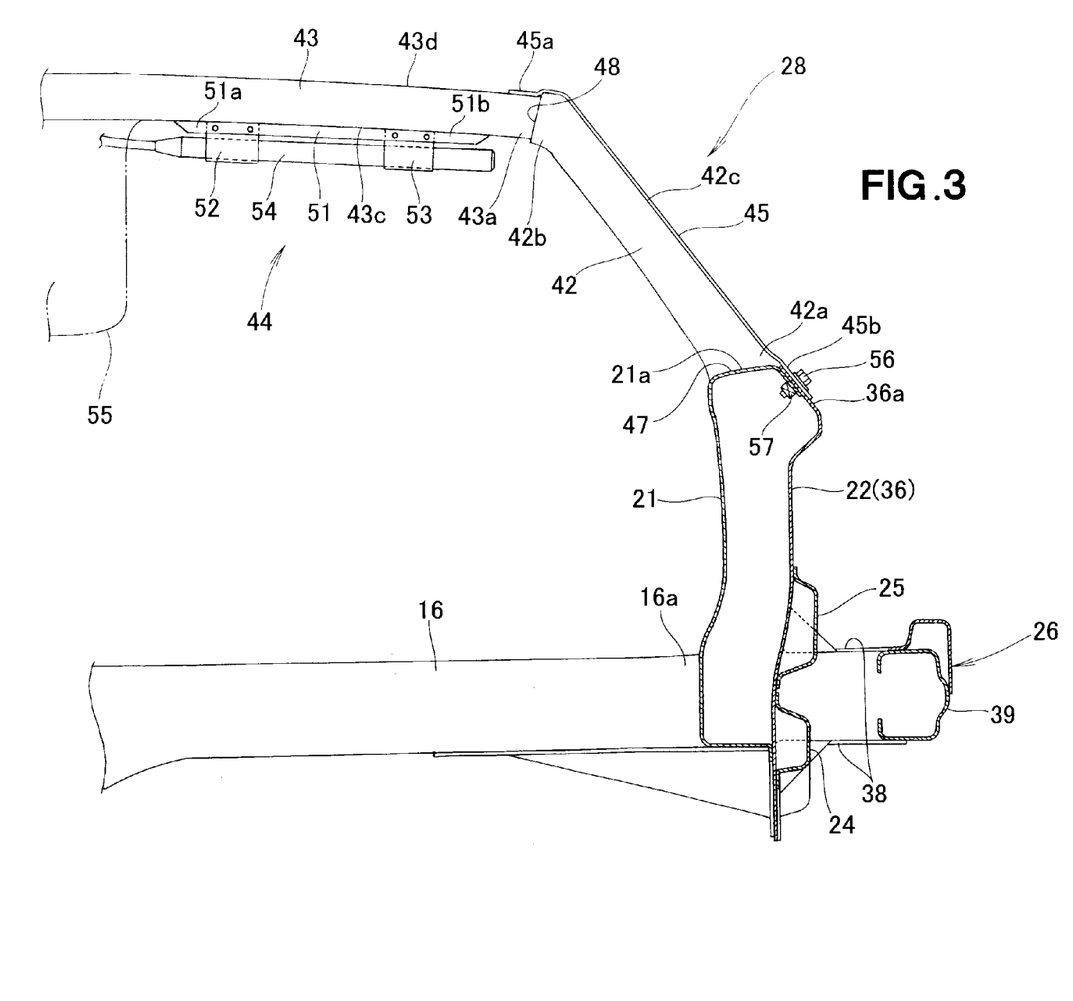
FIG. 3 is an enlarged cross-sectional view taken along line 3-3 of FIG. 1.

As shown in FIG. 1, the structure 10 for a vehicle body rear portion is provided with left and right side sills 11 that are disposed across a predetermined gap in the vehicle width direction and extend in the longitudinal direction of the vehicle body; a middle cross member 12 spanning rear end sections 11a of the left and right side sills 11; left and right center pillars 13 erected from the rear end sections 11a of the left and right side sills 11; left and right roof side rails 14 provided to an upper end section 13a of the left and right center pillars 13; a roof rail 15 spanning the left and right roof side rails 14; and left and right rear side frames 16 extending from the left and right side sills 11 toward the rear of the vehicle (see FIG. 3 for the right rear side frame 16).

Figure 2:
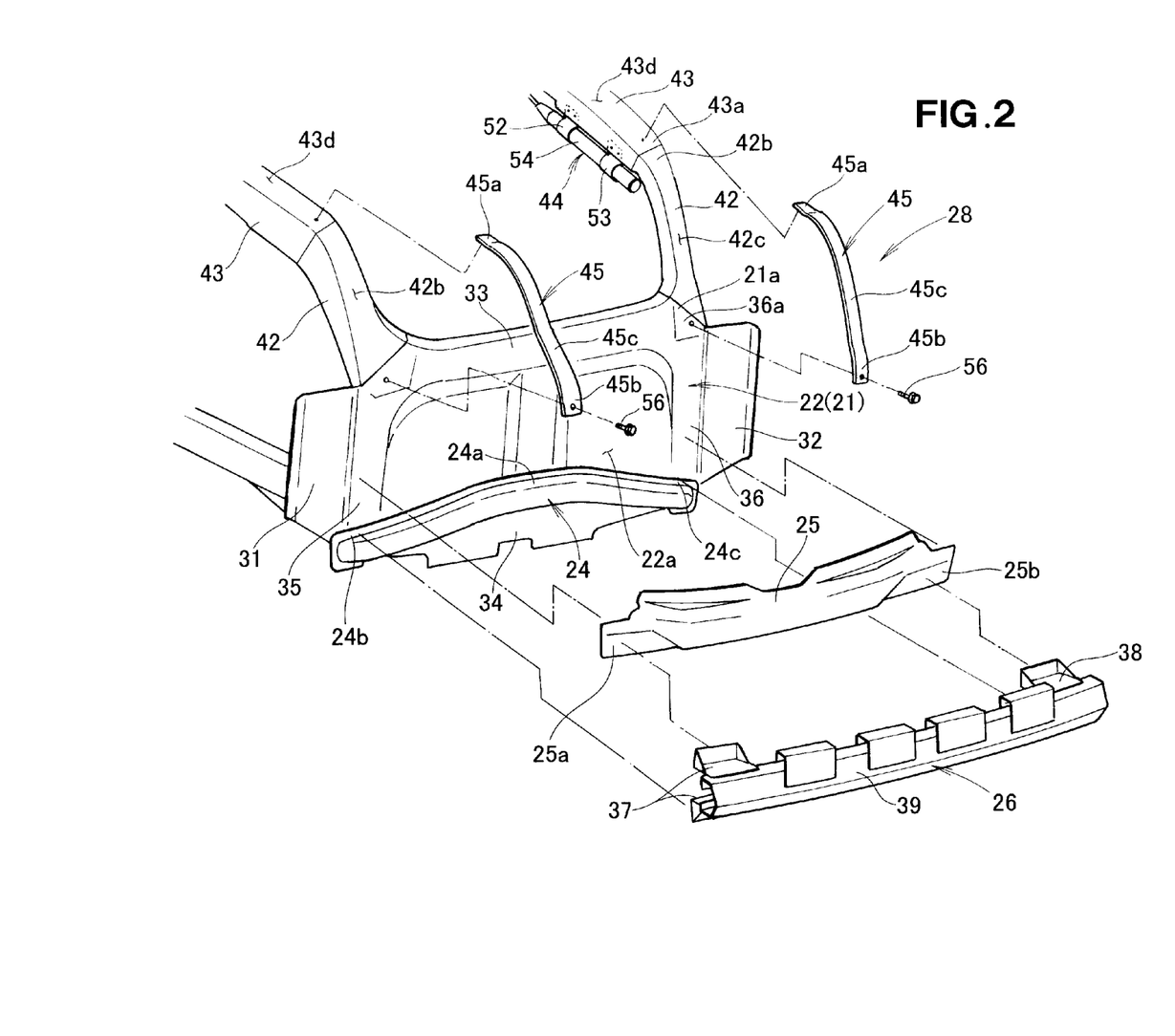
FIG. 2 is an exploded perspective view showing the vehicle body rear portion structure shown in FIG. 1.

As shown in FIGS. 1 and 2, the structure 10 for a vehicle body rear portion is provided with a rear wall section 21 (see also FIG. 3) that spans rear end sections 16a of the left and right rear side frames 16; a rear panel lower member 24 provided to a rear panel 22 of the rear wall section 21; a rear panel upper member 25 provided above the rear panel lower member 24; a rear bumper beam 26 provided to the rear panel upper member 25 and the rear panel lower member 24; and connection reinforcement means 28 for connecting the rear panel 22 to the left and right roof side rails 14.

The left rear side frame 16 is an aggregate that extends from the left side sill 11 toward the vehicle rear and that is formed having a closed cross sectional shape. The right rear side frame 16 is a member bilaterally symmetric to the left rear side frame 16, and is an aggregate that extends from the right side sill 11 toward the vehicle rear and that is formed so as to have a closed cross sectional shape.

The rear panel 22 is a plate material constituting the external panel of the rear wall section 21 and is formed in a substantially rectangular shape. The rear panel 22 has a left end section 31 that projects outward (left side) in the vehicle width direction from the rear end section 16a of the left rear side frame 16, a right end section 32 that projects outward (right side) in the vehicle width direction from the rear end section 16a of the right rear side frame 16 (see FIG. 3), and an upper end center section 33 that projects upward.

The rear panel lower member 24 is provided to a lower end section 34 at a rear surface 22a of the rear panel 22, and is a member that extends in the vehicle width direction from the vicinity (hereinbelow referred to as left vicinity section of the rear panel) 35 of the left end section 31 to the vicinity (hereinbelow referred to as right vicinity section of the rear panel) 36 of the right end section 32 to thereby reinforce the rear panel 22 (in particular, the vicinity of the lower end section 34 of the rear panel 22). This rear panel lower member 24 is formed so that a center section 24a bulges upward.

The rear panel upper member 25 is provided above the rear panel lower member 24 at the rear surface 22a of the rear panel 22, and is a member that extends in the vehicle width direction from the left vicinity section 35 of the rear panel to the right vicinity section 36 of the rear panel, thereby reinforcing the rear panel 22. The rear panel upper member 25 extends in the vehicle width direction along the rear panel lower member 24.

The rear bumper beam 26 is provided to the vehicle rear (i.e., the rear surface side of the rear panel 22) of the rear panel upper member 25 and the rear panel lower member 24, in a state of being extended in the vehicle width direction. The rear bumper beam 26 is provided with a left leg section 37 that projects from the left vicinity section 35 of the rear panel toward the vehicle rear, a right leg section 38 that projects from the right vicinity section 36 of the rear panel toward the vehicle rear, and a beam main body 39 that spans the rear end sections of the left and right leg sections 37, 38.

Specifically, the left leg section 37 is provided to the left vicinity section 35 of the rear panel via a left end section 25a of the rear panel upper member 25 and a left end section 24b of the rear panel lower member 24. The left leg section 37 is furthermore provided to the rear end section 16a of the left rear side frame 16 via the left vicinity section 35 of the rear panel.

The left end section 25a of the rear panel upper member 25 is a left external end section (external end section) that extends to the left exterior in the vehicle width direction to the region below a left garter stiffener 45. Hereinbelow, the left end section 25a will be referred to as the left external end section (external end section) 25a.

The right leg section 38 is a member bilaterally symmetric to the left leg section 37, and is provided to the right vicinity section 36 of the rear panel interposed by a right end section 25b of the rear panel upper member 25 and a right end section 24c of the rear panel lower member 24. The right leg section 38 is furthermore provided to the rear end section 16a (see FIG. 3) of the right rear side frame 16 via the right vicinity section 36 of the rear panel.

The right end section 25b of the rear panel upper member 25 is a right external end section (external end section) that projects to the right exterior in the vehicle width direction to a region below a right garter stiffener 45 (described later). Hereinbelow, the right end section 25b will be referred to as the right external end section (external end section) 25b.

The beam main body 39 spans the left and right leg sections 37, 38. Therefore, the beam main body 39 is disposed with a gap from the rear panel upper member 25 toward the vehicle rear, and is disposed with a gap from the rear panel lower member 24 toward the vehicle rear.

The rear bumper beam 26 is a member in which the beam main body 39 is capable of deforming in the manner indicated by the arrow A toward the rear panel upper member 25 (i.e., the rear panel 22) by an impact load F (see FIG. 1) applied from the vehicle rear to an upper section of the beam main body 39. As a consequence of the beam main body 39 deforming in the manner indicated by the arrow A toward the rear panel upper member 25, the deformed beam main body 39 thus makes contact with the rear panel upper member 25.

The rear panel upper member 25 is a member for reinforcing the rear panel 22 (in particular, the center section vicinity in the vertical direction of the rear panel 22). Therefore, the impact load F applied to the rear bumper beam 26 can be dispersed to a wide area of the rear panel 22 via the rear panel upper member 25, and the rear panel 22 can be prevented from locally deforming.

Thus, by preventing local deformation of the rear panel 22 and dispersing the impact load F to a wide area of the rear panel 22, the impact load dispersed to the rear panel 22 can be reliably transmitted to the right lower garter section 42 and the right garter stiffener 45.

The right lower garter section 42 and the right garter stiffener 45 are illustrated in detail in FIG. 3.

The connection reinforcement means 28 is provided with left and right lower garter sections 42 erected upward from the rear panel 22, left and right upper garter sections 43 extended from the left and right lower garter sections 42 to the left and right roof side rails 14, left and right upper garter reinforcement sections 44 (the left upper garter reinforcement section 44 is not shown) for reinforcing the left and right upper garter sections 43, and left and right garter stiffeners (garter stiffener) 45 that are capable of holding the left and right lower garter sections 42.

The left and right lower garter sections 42, the left and right upper garter sections 43, the left and right upper garter reinforcement sections 44, and the left and right garter stiffeners 45 are each bilaterally symmetrical members. Hereinbelow, the right side of each member will be described and a description of the left side members will be omitted.

The right lower garter section 42 is formed having a closed cross sectional shape and is erected with a rising slope toward the vehicle front from a right upper end section 21a of the rear wall section 21 (the upper end section 36a of the right vicinity section 36 of the rear panel) to a rear end section 43a of the right upper garter section 43, as shown in FIG. 3. In other words, a lower end section 42a of the right lower garter section 42 and the right upper end section 21a of the rear wall section 21 are connected by a joint section 47. The right lower garter section 42 has an upper end section 42b that is connected to the upper garter rear end section 43a.

The rigidity of the right lower garter section 42 is set so as to allow the right lower garter section 42 to deform by an impact load dispersed to the rear panel 22. Therefore, in the case that a counterpart vehicle (not shown) collides with the rear panel 22 (rear bumper beam 26) from the vehicle rear and the impact load is dispersed (applied) to the rear panel 22, the right lower garter section 42 is made to deform toward the vehicle front by the dispersed impact load and a portion of the impact load can be absorbed by the right lower garter section 42.

The right upper garter section 43 is formed having a closed cross sectional shape in the same manner as the right lower garter section 42. The right upper garter section 43 has an upper garter rear end section 43a that is connected to the lower garter upper end section 42b and is extended with a rising slope toward the vehicle front from the lower garter upper end section 42b to a rear end section 14a of the right roof side rail 14 (FIG. 1). The front end section 43b of the right upper garter section 43 (FIG. 1) is connected to the rear end section 14a of the right roof side rail 14.

The garter joint section (connecting section) 48 of the upper garter rear end section 43a and the lower garter upper end section 42b is joined together by MIG welding in a state of the lower garter upper end section 42b being superimposed on the upper garter rear end section 43a. MIG welding is a type of inert-gas arc welding, and is welding that uses a welding wire as an electrode. In other words, MIG welding does not require that two sections be held between two electrodes to be joined (the upper garter rear end section 43a and the lower garter upper end section 42b) as is the case in spot welding when such sections are to be joined.

The rising slope of the right upper garter section 43 is set to be less than the rising slope of the right lower garter section 42. Therefore, the right upper garter section 43 and the right lower garter section 42 are connected in a substantially dog-leg shape.

As a consequence of the right upper garter section 43 extending in a rising slope toward the vehicle front, the right upper garter section 43 has a rear section upper surface 43d.

The right upper garter reinforcement section 44 is provided with a protruding piece 51 that protrudes downward from a lower surface 43c of the right upper garter section 43, a front mounting bracket 52 provided to a front end section 51a of the protruding piece 51, a rear mounting bracket 53 provided to a rear end section 51b of the protruding piece 51, and an inflator 54 supported by the front and rear mounting brackets 52, 53.

The protruding piece 51 extends in the front-rear direction (lengthwise direction) of the vehicle body along the upper garter lower surface 43c. Therefore, by having the inflator 54 mounted on the protruding piece 51 interposed by the front and rear mounting brackets 52, 53, the inflator 54 is provided along the front-rear direction (lengthwise direction) of the vehicle body on the upper garter lower surface 43c. The inflator 54 feeds compressed gas to a side airbag 55 (see FIG. 1) in order to deploy the side airbag 55.

Having the inflator 54 provided along the lengthwise direction of the right upper garter section 43 thus enables the right upper garter section 43 to be reinforced by the inflator 54. Therefore, the right upper garter section 43 is formed to a higher level of strength (higher rigidity) than the right lower garter section 42. It is thereby possible for the right upper garter section 43 to reliably transmit an impact load applied from the right lower garter section 42 toward the vehicle front to the right roof side rail (vehicle body) 14 shown in FIG. 1.

Jointly using the inflator 54 as a reinforcement member enables the plate thickness dimension of the right upper garter section 43 to be increased and high strength (high rigidity) of the right upper garter section 43 ensured without the use of highly rigid material. The right upper garter section 43 can thereby be formed to a higher level of strength (rigidity) than the right lower garter section 42 in a state of the weight and cost increases being minimized.

The right garter stiffener 45 is formed from a bent strip of metal plate, and is thereby formed to allow the right garter stiffener 45] to be disposed along an upper garter upper 43d and an outer surface 42c of the right lower garter section 42 (see also FIGS. 1 and 2). An upper end section 45a of the right garter stiffener 45 is joined by MIG welding to the right upper garter section 43 (specifically, the upper garter upper surface 43d). Specifically, the upper end section 45a of the right garter stiffener 45 is the region joined to the upper garter upper surface 43d.

A lower end section 45b of the right garter stiffener 45 is coupled (connected) to the upper end section 36a of the right vicinity section 36 of the rear panel by a fastener member (specifically, a bolt 56 and weld nut 57). In other words, the lower end section 45b of the right garter stiffener 45 is the region of the right garter stiffener 45 that is provided to the lower garter outer surface 42c.

Having the right garter stiffener 45 provided along the upper garter upper surface 43d and the lower garter outer surface 42c enables the garter joint section 48 of the lower garter upper end section 42b and the upper garter rear end section 43a to be reinforced by the right garter stiffener 45. Therefore, the right lower garter section 42 and the right upper garter section 43 can be kept in a state of being connected by the right garter stiffener 45, in a state in which the right lower garter section 42 has been made to deform toward the vehicle front. Keeping the right lower garter section 42 and the right upper garter section 43 in a connected state enables the impact load transmitted to the right lower garter section 42 to be reliably transmitted to the right roof side rail 14 shown in FIG. 1 via the right upper garter section 43.

As described above, a portion of the impact load is absorbed by the deformation of the right lower garter section 42. Since a portion of the impact load is absorbed by the right lower garter section 42, the impact load transmitted to the right roof side rail 14 by way of the right upper garter section 43 can be considerably minimized. Additionally, since the impact load transmitted to the right roof side rail 14 is considerably minimized, the reaction force applied to the counterpart vehicle (not shown) can be considerably minimized.

Here, the right lower garter section 42 and the right upper garter section 43 are frame members constituting a portion of the structure 10 for a vehicle body rear portion. Therefore, the frame members (i.e., the right lower garter section 42 and the right upper garter section 43) constituting a portion of the structure 10 for a vehicle body rear portion can be dually used as members for absorbing and transmitting the impact load. It is thereby possible to minimize any increase in the number of components because members for absorbing and transmitting the impact load are not required to be separately provided.

The right garter stiffener 45 is provided along the lower garter outer surface 42c, and the stiffener lower end section 45b of the right garter stiffener 45 is coupled to the upper end section 36a of the right vicinity section 36 of the rear panel. The impact load dispersed to the rear panel 22 can thereby be rapidly transmitted to the right lower garter section 42 via the upper end section 36a of the right vicinity section 36 of the rear panel and the right garter stiffener 45.

Having the right garter stiffener 45 provided along the lower garter outer surface 42c, and the stiffener lower end section 45b connected to the upper end section 36a enables the right garter stiffener 45 to be disposed across the entire range from the lower garter upper end section 42b to the lower garter lower end section 42a.

Therefore, the impact load transmitted to the right garter stiffener 45 can be transmitted from the right garter stiffener 45 across the entire range of the right lower garter section 42. It is thereby possible for the impact load to be efficiently absorbed because the entire range of the right lower garter section 42 can be deformed by the impact load transmitted from the right garter stiffener 45.

Additionally, the right garter stiffener 45 is formed from a metal plate. The metal plate is a member that can be adequately deformed by an impact load. Therefore, the right garter stiffener 45 can be made to follow the right lower garter section 42 and to adequately deform in the case that an impact load is applied to the right garter stiffener 45. Since the right garter stiffener 45 can be made to follow the right lower garter section 42 and deform toward the vehicle front, the impact load transmitted to the right garter stiffener 45 can be efficiently absorbed.

The metal plate is a readily available plate material, and having the right garter stiffener 45 be formed using a readily available plate material enables the right garter stiffener 45 to be obtained at low cost.

Figure 4:
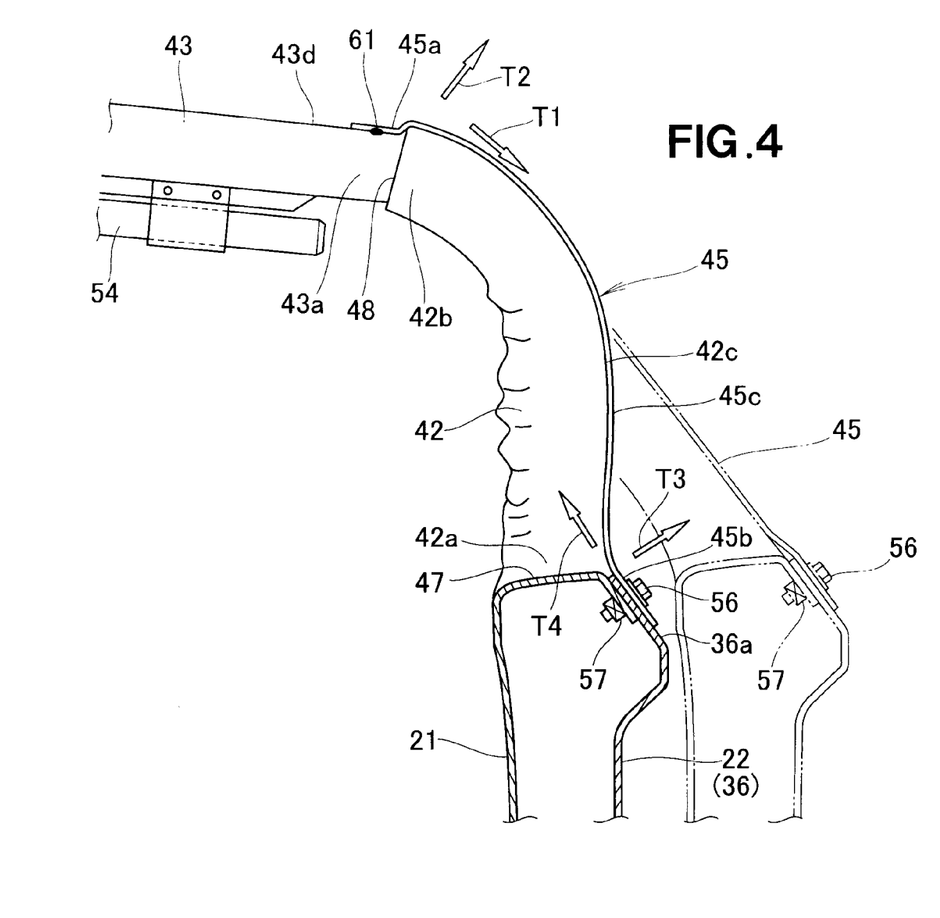
FIG. 4 is a cross-sectional view showing the vehicle body rear portion structure of FIG. 3 deformed forwardly of a vehicle due to an impact load.

As shown in FIG. 4, the right garter stiffener 45 is joined to the upper surface 43d of the upper garter rear end section 43a and is provided along the outer surface 42c of the right lower garter section 42 (see also FIG. 3). Therefore, the stiffener lower end section 45b deforms toward the vehicle front following the right lower garter section 42.

Having the right garter stiffener 45 deform toward the vehicle front following the right lower garter section 42 enables a tensile force T1 to be applied to the stiffener upper end section 45a of the right garter stiffener 45. By applying the tensile force T1 to the stiffener upper end section 45a, a shearing force is generated in a joint section (hereinbelow referred to as "stiffener joint section") 61 of the stiffener upper end section 45a and the upper surface 43d of the upper garter rear end section 43a.

The stiffener joint section 61 breaks under a lower force than the shearing force in the case that a force T2 is applied to the stiffener upper end section 45a in the detaching direction from the upper surface 43d of the upper garter rear end section 43a. In other words, the stiffener joint section 61 can be kept at a relatively high level of strength (rigidity) with respect to the shearing force.

Even if the right garter stiffener 45 is provided to the inner surface (interior-side surface) of the right lower garter section 42 and to the inner surface (interior-side surface) that serves as the lower surface 43c of the right upper garter section 43, and the stiffener upper end section 45a is joined by welding to the lower surface 43c of the right upper garter section 43, the stiffener joint section 61 breaks under a lower force than the shearing force because a detaching force operates due to the tensile force from the stiffener upper end section 45a. However, when the stiffener upper end section 45a is joined by welding to the upper surface 43d of the upper garter rear end section 43a as described in the present embodiment, the shearing force from the stiffener upper end section 45a is applied to the stiffener joint section 61, and the strength can be kept relatively high in contrast with an example in which the stiffener upper end section 45a is welded to the lower surface 43c of the right upper garter section 43.

In view of the above, a configuration is adopted so that the tensile force T1 is applied to the stiffener upper end section 45a when the area 45c of the right garter stiffener 45 has deformed. In other words, there is adopted a configuration wherein the stiffener upper end section 45a is joined to the upper surface 43d of the upper garter rear end section 43a. Therefore, a shearing force can be generated in the stiffener joint section 61. The garter joint section 48 can thereby be kept in a joined state (connected state) by the right garter stiffener 45, and the impact load is reliably transmitted from the right lower garter section 42 to the right upper garter section 43.

As described above, each of the right lower garter section 42 and the right upper garter section 43a is formed having a closed cross section. Therefore, an electrode insertion hole (i.e., a hole for inserting an electrode for spot welding) must be formed in the right lower garter section 42 or the right upper garter section 43 in order to join the lower garter upper end section 42b and the upper garter rear end section 43a by spot welding. Accordingly, the rigidity of the right lower garter section 42 and the right upper garter section 43 must be ensured with consideration given to a reduction in rigidity due to the electrode insertion hole.

In view of the above, in the first embodiment, the lower garter upper end section 42b is joined by MIG welding to the upper garter rear end section 43a, and the stiffener upper end section 45a of the right garter stiffener 45 is joined by MIG welding to the upper surface 43d of the upper garter rear end section 43a. MIG welding does not require that two sections been held between electrodes to be joined as is the case of joining by spot welding. Accordingly, the electrode insertion hole can be eliminated from the right lower garter section 42 or the right upper garter section 43, and the rigidity of the right lower garter section 42 and the right upper garter section 43 can be readily ensured.

Here, the stiffener lower end section 45b of the right garter stiffener 45 is coupled (connected) to the upper end section 36a of the right vicinity section 36 of the rear panel by a bolt 56 and a weld nut 57 as described above. In the case that the right garter stiffener 45 deforms toward the vehicle front following the right lower garter section 42, there is applied a force T3 that detaches the stiffener lower end section 45b in the direction that intersects the lengthwise direction of the right garter stiffener 45, or a force T4 is applied that pulls the stiffener lower end section 45b in the lengthwise direction.

A tensile force is applied to the bolt 56 in the case that the force T3 that detaches the stiffener lower end section 45b is applied. A shearing force is applied to the bolt 56 in the case that the force T4 that pulls the stiffener lower end section 45b is applied.

The bolt 56 can be kept at higher strength (rigidity) against tensile force and shearing force than with a welded joint section (e.g., the stiffener joint section 61). Therefore, in the case that the right garter stiffener 45 deforms toward the vehicle front following the right lower garter section 42, the stiffener lower end section 45b can be reliably kept in a state coupled to the upper end section 36a of the right vicinity section 36 of the rear panel. The impact load dispersed to the rear panel 22 can thereby be reliably transmitted to the right lower garter section 42 and the right upper garter section 43 via the right garter stiffener 45.

The right external end section (external end section) 25b of the rear panel upper member 25 extends to the region below the right garter stiffener 45 (specifically, the stiffener lower end section 45b), as shown in FIGS. 1 and 2. The left external end section 25a (external end section) of the rear panel upper member 25 extends to the area below the left garter stiffener 45 (specifically, the stiffener lower end section 45b). The impact load dispersed (transmitted) to the rear panel 22 can thereby be rapidly transmitted from the rear panel 22 to the left and right garter stiffeners 45.

Figure 5:
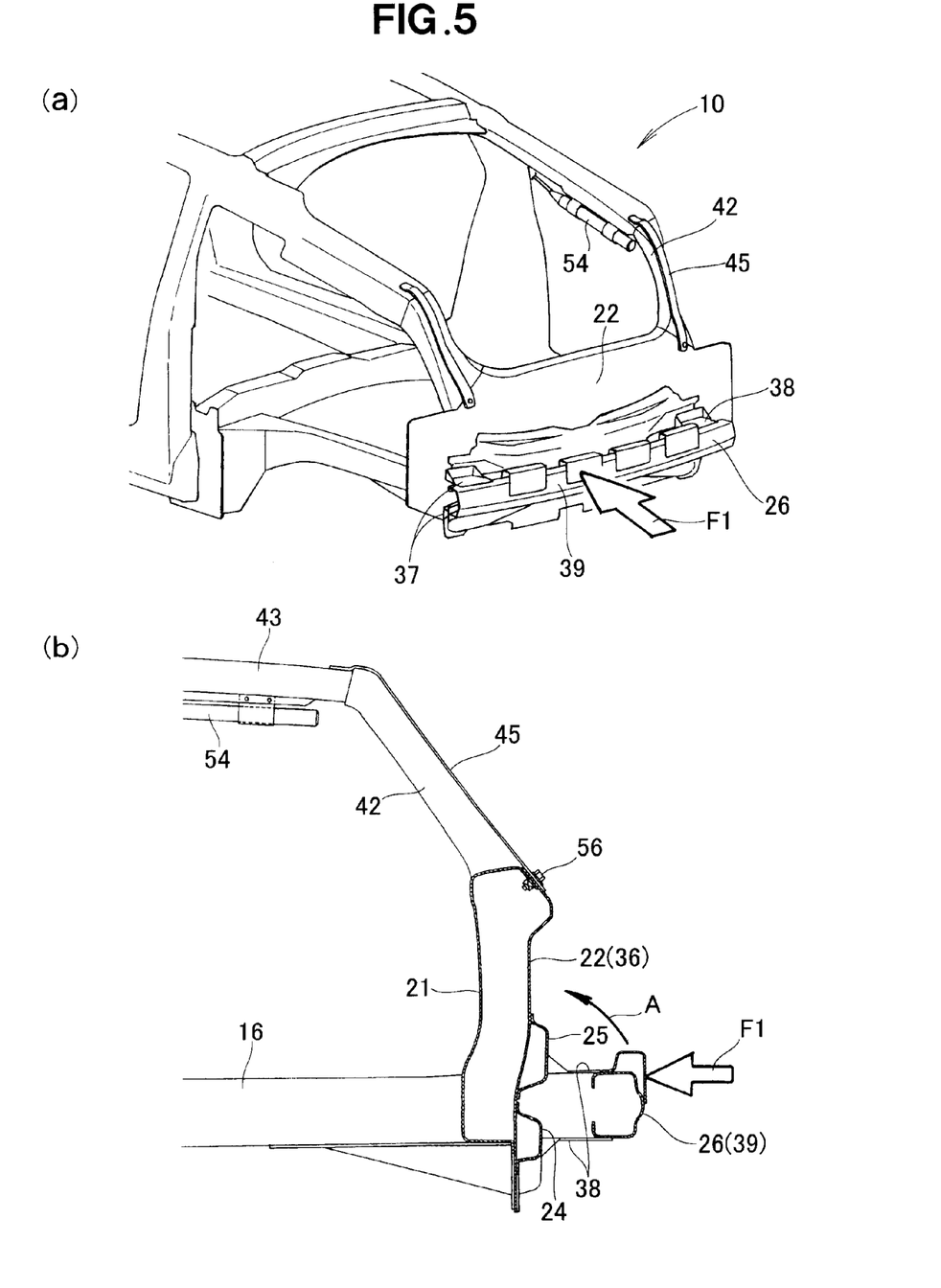
FIG. 5 is a view illustrating an example impact load applied from the rear of the vehicle to a rear bumper beam according to the first embodiment.
Figure 6:
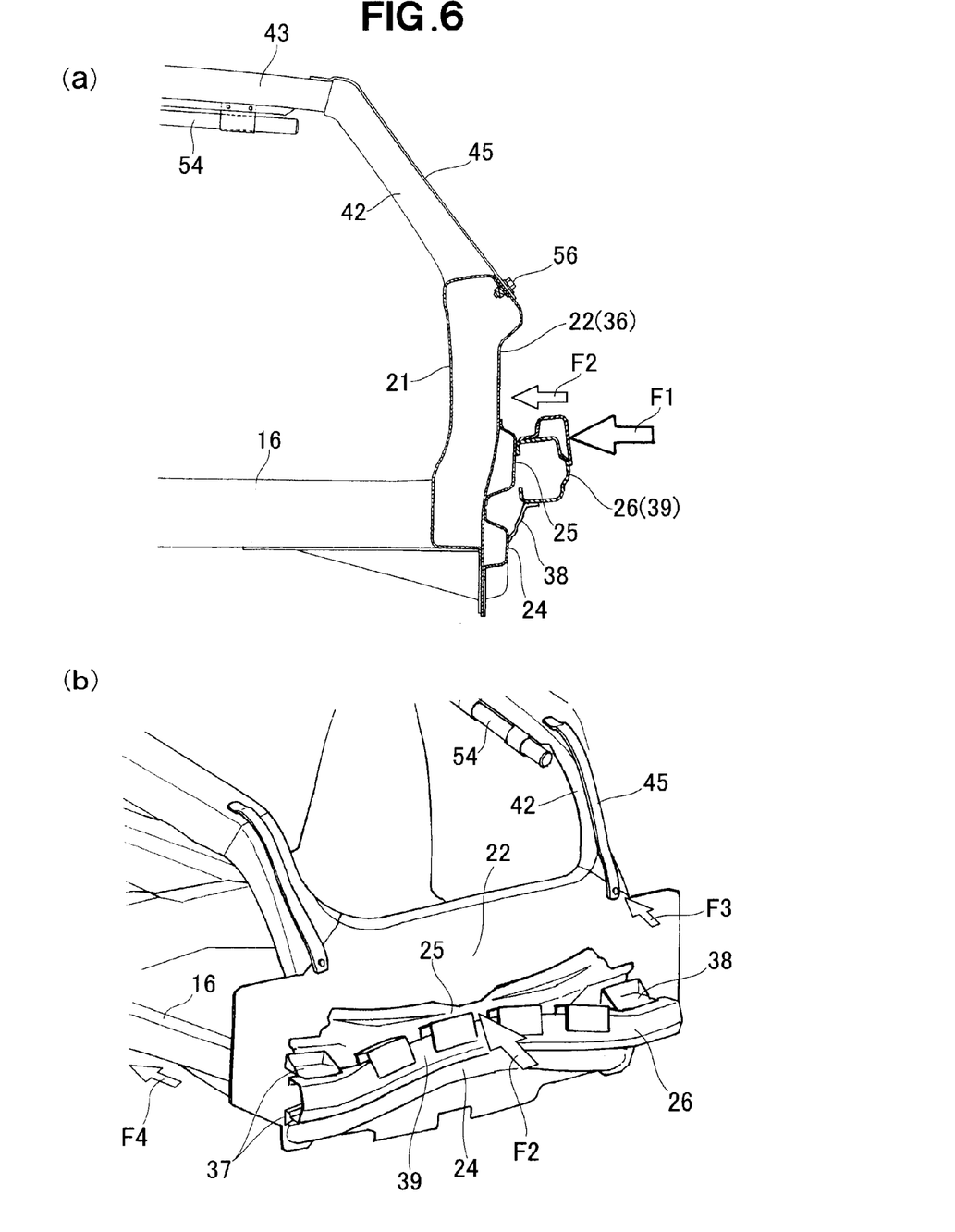
FIG. 6 is a view illustrating an example impact load transmitted to a right lower garter section and a right garter stiffener according to the first embodiment.
Figure 7:
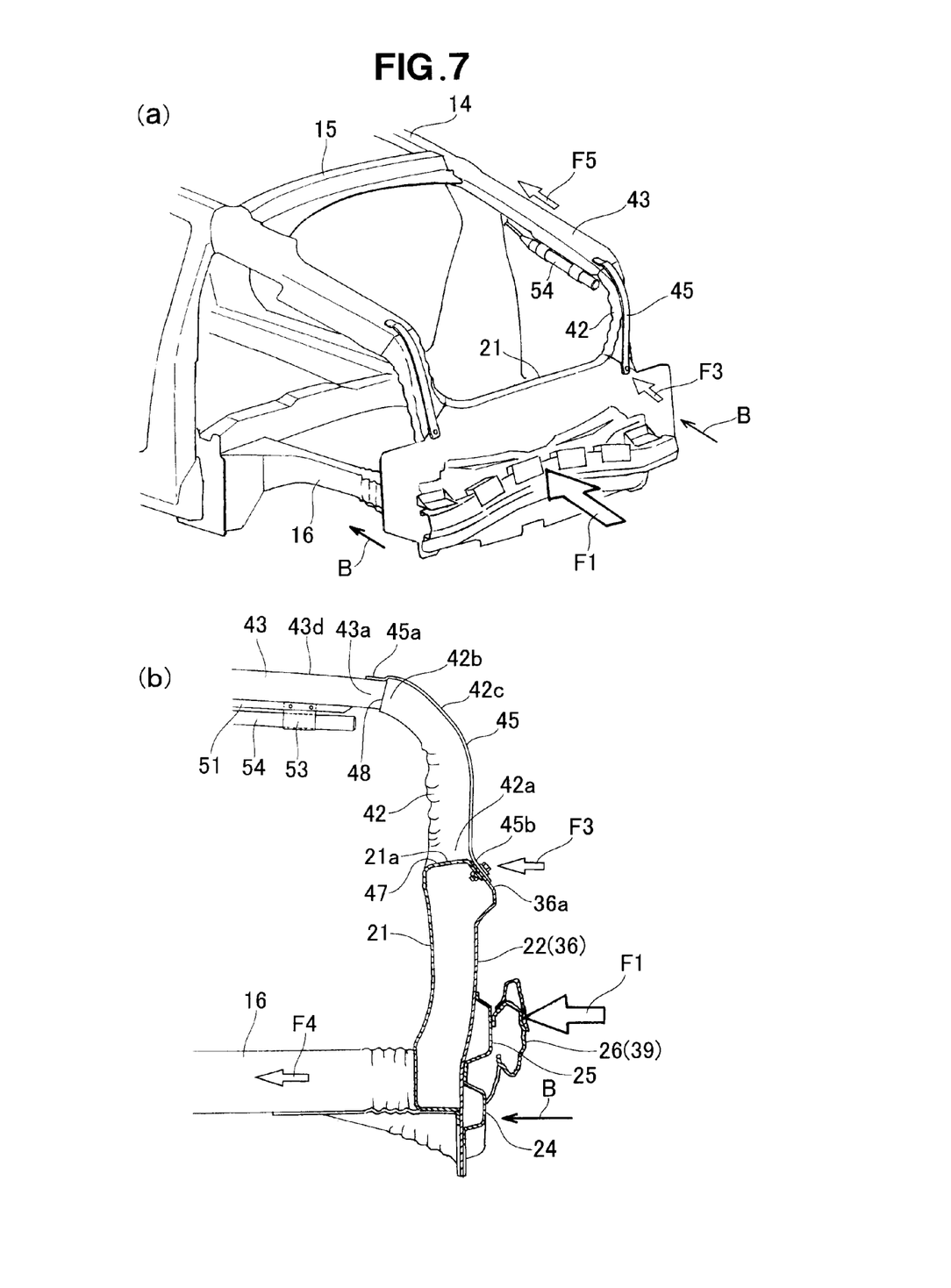
FIG. 7 is a view showing an example impact load born by the vehicle body rear portion structure according to the first embodiment.

Described next with reference to FIGS. 5 to 7 is an example in which an impact load F1 is applied to the rear bumper beam 26 of the structure 10 for a vehicle body rear portion from the vehicle rear toward the front. The structure 10 for a vehicle body rear portion has substantially bilaterally symmetric constituent members. Therefore, the right side members will be described and a description of the left side members will be omitted in order to facilitate understanding.

The impact load F1 is applied toward the front from the vehicle rear to the beam main body 39 of the rear bumper beam 26 provided to the structure 10 for a vehicle body rear portion, as shown in FIG. 5(a).

Since the impact load F1 is applied to the beam main body 39, the beam main body 39, and the left and right leg sections 37, 38 (see FIG. 5(a) for the left leg section 37) of the rear bumper beam 26 deform, and the beam main body 39 deforms as indicated by the arrow A, as shown in FIG. 5(b). By having the left and right leg sections 37, 38 and the beam main body 39 deform, a portion of the impact load F1 is absorbed.

The beam main body 39 makes contact with the rear panel upper member 25, as shown in FIG. 6(a). Since the beam main body 39 makes contact with the rear panel upper member 25, the remaining impact load F1 is transmitted to the rear panel upper member 25 as an impact load F2.

The impact load F2 transmitted to the rear panel upper member 25 is dispersed to a wide area of the rear panel 22 via the rear panel upper member 25, and the rear panel 22 is prevented from locally deforming, as shown in FIG. 6(b). Therefore, a portion of the impact load transmitted to the rear panel 22 can be reliably transmitted as an impact load F3 from the rear panel 22 to the right lower garter section 42 and the right garter stiffener 45. The remaining impact load transmitted to the rear panel 22 is transmitted as an impact load F4 to the left and right rear side frames 16.

By having the impact load F3 transmitted to the right lower garter section 42 and the right garter stiffener 45, the right lower garter section 42 and the right garter stiffener 45 deform toward the vehicle front, as shown in FIG. 7(a). Also, by having the impact load F4 transmitted to the right rear side frame 16 (see FIG. 7(b)), the right rear side frame 16 deforms toward the vehicle front.

By having the right lower garter section 42 and the right garter stiffener 45 deform and the right rear side frame 16 deform, the rear wall section 21 (i.e., the rear panel 22) moves in the manner indicated by the arrow B toward the vehicle front, as shown in FIG. 7(b) (see also FIG. 7(a)).

In this state, the stiffener lower end section 45b of the right garter stiffener 45 can be kept in a state of being coupled to the upper end section 36a of the right vicinity section 36 of the rear panel. Therefore, providing the right garter stiffener 45 enables the joint section 47 of the lower garter lower end section 42a and the right upper end section 21a of the rear wall section 21 (the upper end section 36a of the right vicinity section 36 of the rear panel) to be kept in a connected state.

Furthermore, the stiffener upper end section 45a of the right garter stiffener 45 can be kept in a state of being joined to the upper surface 43d of the upper garter rear end section 43a. Therefore, the upper garter rear end section 43a and the lower garter upper end section 42b can be kept in a state of being connected by the right garter stiffener 45 at the garter joint section 48.

Therefore, it is possible keep the right lower garter section 42 and the right garter stiffener 45 in a held state. It is thereby possible to cause the right lower garter section 42 and the right garter stiffener 45 to reliably deform by the impact load F3.

By having the right lower garter section 42 and the right garter stiffener 45 deform, a portion of the impact load F3 transmitted to the right lower garter section 42 and the right garter stiffener 45 can be absorbed. Also, by having the right rear side frame 16 deform, a portion of the impact load F4 transmitted to the right rear side frame 16 can be absorbed.

By having a portion of the impact load F3 absorbed and a portion of the impact load F4 absorbed, the reaction force applied to the counterpart vehicle (not shown) can be considerably minimized.

Additionally, by having a portion of the impact load F3 absorbed, an impact load F5 transmitted to the right upper garter section 43 can be considerably minimized.

The impact load F5 transmitted to the right upper garter section 43 is transmitted to the right roof side rail 14 (see FIG. 7(a)) via the right upper garter section 43.

Here, since the inflator 54 is provided along the lengthwise direction of the right upper garter section 43, the right upper garter section 43 is reinforced by the inflator 54.

Therefore, the impact load F5 transmitted to the right upper garter section 43 can be reliably transmitted to the right roof side rail 14 via the right upper garter section 43. It is thereby possible for the impact load F1 applied to the rear bumper beam 26 from the vehicle rear toward the front to be adequately supported by the structure 10 for a vehicle body rear portion.

Second Embodiment

Next, a second embodiment will be described with reference to FIG. 8. In the second embodiment, the same reference numerals will be used for the same or similar members as those in the structure 10 for a vehicle body rear portion of the first embodiment, and a description thereof will be omitted.

A structure 70 for a vehicle body rear portion according to the second embodiment will be described.

Figure 8:
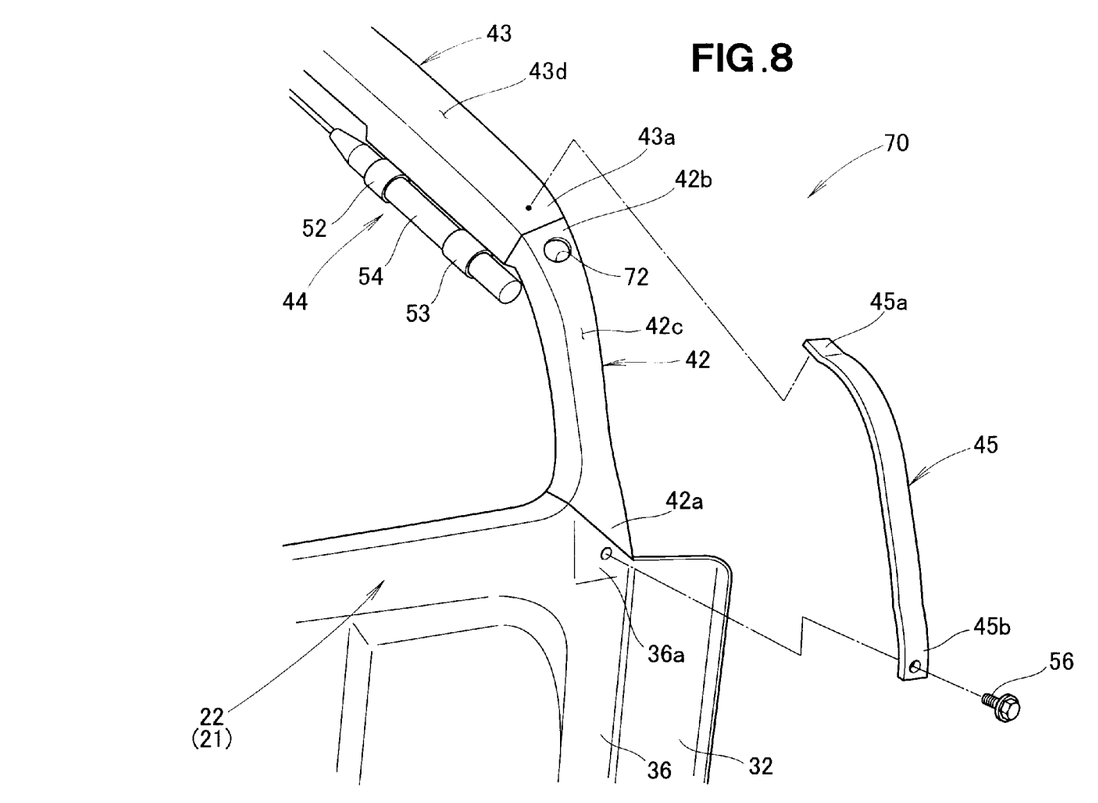
FIG. 8 is an exploded perspective view showing a vehicle body rear portion structure according to a second embodiment of the present invention.

The structure 70 for a vehicle rear portion has a right upper garter section 43 and a right lower garter section 42 that are joined (connected) by spot welding, and a stiffener upper end section 45a of a right garter stiffener 45 that is joined (connected) to the right upper garter section 43 by spot welding, as shown in FIG. 8. The configuration is otherwise the same as the structure 10 for a vehicle body rear portion according to the first embodiment.

Each of the right lower garter section 42 and the right upper garter section 43 is formed having a closed cross sectional shape as described in the first embodiment. An electrode insertion hole 72 is formed in the lower garter outer surface 42c of the lower garter upper end 42b. The electrode insertion hole 72 is a hole into which an electrode (not shown) for spot welding can be inserted in the right lower garter section 42 and the right upper garter section 43.

When the lower garter upper end section 42b and the upper garter rear end section 43a are to be joined by spot welding, one of the electrodes (not shown) is inserted from the electrode insertion hole 72. The lower garter upper end section 42b and the upper garter rear end section 43a are held between the inserted electrode and another electrode (not shown), and an electric current is fed to the electrodes to join (connect) the lower garter upper end section 42b and the upper garter rear end section 43a by spot welding.

The stiffener upper end section 45a of the right garter stiffener 45 is furthermore joined by spot welding to the upper surface 43d of the upper garter rear end section 43a. In other words, the stiffener upper end section 45a and the upper surface 43d of the upper garter rear end section 43a are held between the electrode inserted from the electrode insertion hole 72 and another electrode. In this state, an electric current is fed to the electrodes, whereby the stiffener upper end section 45a and the upper surface 43d of the upper garter rear end section 43a are joined (connected) by spot welding.

The right garter stiffener 45 is provided to the lower garter outer surface 42c at the lower garter upper end 42b of the right lower garter section 42 by having the stiffener upper end section 45a joined to the upper surface 43d of the upper garter rear end section 43a. Therefore, the electrode insertion hole 72 can be covered by the right garter stiffener 45.

Having the electrode insertion hole 72 covered by the right garter stiffener 45 enables the vicinity of the electrode insertion hole 72 in the right upper garter section 43 to be reinforced by the right garter stiffener 45.

In the case that an impact load has been applied to the right lower garter section 42, it is thereby possible to prevent stress from concentrating in the electrode insertion hole 72 using the right garter stiffener 45, and to ensure the rigidity of the right lower garter section 42.

The vehicle body rear portion structure according to the present invention is not limited to the embodiments described above; it can be suitably modified, improved, or otherwise adjusted. For example, in the first and second embodiments, the inflator 54 was used as an example of the right upper garter reinforcement section 44, but no limitation is imposed thereby; it also being possible to use another reinforcement member, or to increase the plate thickness of the right upper garter reinforcement section 44 so as to increase the rigidity of the right upper garter reinforcement section 44.

An example was described in which the inflator 54 is provided to the lower external side of the right upper garter section 43, but no limitation is imposed thereby; it also being possible to accommodate the inflator 54 inside the right upper garter section 43.

In the first and second embodiments, the bolt 56 and the weld nut 57 are used as examples of the fastener member for coupling the stiffener lower end section 45b of the right garter stiffener 45 to the upper end section 36a of the right vicinity section 36 of the rear panel, but no limitation is imposed thereby; it also being possible to use a rivet or another fastener member.

An example was furthermore described in the second embodiment in which an electrode insertion hole 72 is formed in the right lower garter section 42, but no limitation is imposed thereby; it also being possible to form the electrode insertion hole 72 in the right upper garter section 43.

An example was described in which the electrode insertion hole 72 is formed as a circular shape, but no limitation is imposed thereby; it also being possible to form the electrode insertion hole 72 in a substantially rectangular shape or another shape.

No limitation is imposed by the shape and configuration of the left and right roof side rails 14, the rear wall section 21, the rear panel 22, the rear panel lower member 24, the rear panel upper member 25, the rear bumper beam 26, the left and right lower garter sections 42, the left and right upper garter sections 43, the left and right garter stiffeners 45, the garter joint section 48, the side airbag 55, the bolt 56 and weld nut 57, and other components exemplified in the first and second embodiments; it also being possible to make suitable modifications.

INDUSTRIAL APPLICABILITY

The present invention is advantageously applied to an automobile provided with a structure for a vehicle body rear portion in which a rear wall section is provided to the vehicle body rear portion, the vehicle body rear portion structure supporting an impact load applied to a rear panel that forms the rear wall section.

Reference Signs List 10, 70: structure for a vehicle body rear portion; 14: left and right roof side rails; 21: rear wall section; 22: rear panel; 24: rear panel lower member; 25: rear panel upper member; 25a, 25b: left and right external end sections of the rear panel upper member; 26: rear bumper beam; 42: left and right lower garter sections (lower garter section), 42b: lower garter upper end section; 42c: lower garter outer surface; 43: left and right upper garter sections; 43a: upper garter rear end section; 43d: upper garter upper surface; 45: left and right garter stiffeners; 45a: stiffener upper end section; 45b: stiffener lower end section; 48: garter joint section (connecting section); 55: side airbag; 56, 57: bolt and weld nut (fastener member); 72: electrode insertion hole; F, F1: impact loads.

The invention claimed is:

1. A vehicle body rear portion structure comprising:
   a rear panel provided to a vehicle body rear portion so as to extend in a width direction of a vehicle;
   a lower garter section rising from the rear panel and capable of deforming under an impact load applied to the rear panel;
   an upper garter section connected to an upper end section of the lower garter section, extending forwardly of the vehicle up to a roof side rail, formed to a higher level of strength than the lower garter section, and being capable of transmitting the impact load to the roof side rail; and
   a garter stiffener for reinforcing a connecting section between the lower garter section and the upper garter section,
   wherein the garter stiffener is connected to an upper surface of a rear section of the upper garter section and provided along an outer surface of the lower garter section.

2. A vehicle body rear portion structure comprising:
   a rear panel provided to a vehicle body rear portion so as to extend in a width direction of a vehicle;
   a lower garter section rising from the rear panel and capable of deforming under an impact load applied to the rear panel;
   an upper garter section connected to an upper end section of the lower garter section, extending forwardly of the vehicle up to a roof side rail, formed to a higher level of strength than the lower garter section, and being capable of transmitting the impact load to the roof side rail; and
   a garter stiffener for reinforcing a connecting section between the lower garter section and the upper garter section,
   wherein each of the lower garter section and the upper garter section is formed to have a closed cross section, and the upper garter section and the lower garter section are joined by MIG welding, and the upper garter section and the garter stiffener are joined by MIG welding.

3. The vehicle body rear portion structure of claim 1, wherein each of the lower garter section and the upper garter section is formed to have a closed cross section, an electrode insertion hole for spot welding is formed in one of the lower garter section and the upper garter section in order to join the upper garter section and the lower garter section by spot welding, and the garter stiffener is provided so that the electrode insertion hole is covered by the garter stiffener.

4. The vehicle body rear portion structure of claim 1, wherein the garter stiffener has an upper end section connected to the upper garter section and a lower end section connected to the rear panel.

5. The vehicle body rear portion structure of claim 4, wherein the lower end section of the garter stiffener is coupled to the rear panel by a fastener member.

6. The vehicle body rear portion structure of claim 1, wherein the garter stiffener is formed using a metal plate.

7. The vehicle body rear portion structure of claim 1, wherein an inflator for causing an airbag to deploy is provided along a lengthwise direction of the upper garter section, whereby the upper garter section is reinforced to a higher level of strength than the lower garter section with an aid of the inflator.

8. A vehicle body rear portion structure comprising:
a rear panel provided to a vehicle body rear portion so as to extend in a width direction of a vehicle;
a lower garter section rising from the rear panel and capable of deforming under an impact load applied to the rear panel;
an upper garter section connected to an upper end section of the lower garter section, extending forwardly of the vehicle up to a roof side rail, formed to a higher level of strength than the lower garter section, and being capable of transmitting the impact load to the roof side rail;
a garter stiffener for reinforcing a connecting section between the lower garter section and the upper garter section;
a rear bumper beam extending in the vehicle width direction in a vehicle rear side of the rear panel and capable of deforming toward the rear panel by an impact load; and
a rear panel member extending along the rear bumper beam in the rear panel, and thereby reinforces the rear panel,
wherein, when the rear bumper beam has deformed toward the rear panel, the deformed rear bumper beam makes contact with the rear panel member.

9. The vehicle body rear portion structure of claim 8, wherein the rear panel member has an external end section in the vehicle width direction that extends to of an area below the garter stiffener in a vehicle vertical direction.

* * * * *